(12) United States Patent
Hashizume et al.

(10) Patent No.: US 10,443,519 B2
(45) Date of Patent: Oct. 15, 2019

(54) CATALYST DETERIORATION DETERMINATION SYSTEM

(71) Applicant: HONDA MOTOR CO., LTD., Tokyo (JP)

(72) Inventors: Mitsuo Hashizume, Wako (JP); Tomohiro Nishi, Wako (JP); Toru Kasai, Wako (JP); Hideyuki Yasuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 15/886,095

(22) Filed: Feb. 1, 2018

(65) Prior Publication Data

US 2018/0216553 A1 Aug. 2, 2018

(30) Foreign Application Priority Data

Feb. 2, 2017 (JP) ................. 2017-017886

(51) Int. Cl.
*F01N 3/10* (2006.01)
*F01N 11/00* (2006.01)
(Continued)

(52) U.S. Cl.
CPC ......... *F02D 41/0235* (2013.01); *F01N 3/101* (2013.01); *F01N 11/00* (2013.01); *F01N 11/007* (2013.01); *F01N 13/0093* (2014.06); *F02D 41/1441* (2013.01); *F02D 41/401* (2013.01); *F02D 41/402* (2013.01); *F01N 2550/02* (2013.01); *F01N 2560/025* (2013.01);
(Continued)

(58) Field of Classification Search
CPC ........ F01N 3/101; F01N 11/00; F01N 11/007; F01N 13/0093; F01N 2550/02; F01N 2560/025; F01N 2560/07; F01N 2900/1402; F02D 41/0235; F02D 41/1441; F02D 41/401; F02D 41/402; F02D 2200/021; Y02T 10/22; Y02T 10/47

See application file for complete search history.

(56) References Cited

U.S. PATENT DOCUMENTS

2007/0220862 A1* 9/2007 Suehiro ................. F01N 3/101
60/277

FOREIGN PATENT DOCUMENTS

JP 2007-285288 A 11/2007

\* cited by examiner

*Primary Examiner* — Audrey K Bradley
(74) *Attorney, Agent, or Firm* — Westerman, Hattori, Daniels & Adrian, LLP

(57) ABSTRACT

A catalyst deterioration determination system effectively prevents erroneous determination caused by increase of the H2 component in exhaust gas and improves accuracy of determination. A LAF sensor and an O2 sensor are provided on the upstream side and downstream side of a three-way catalyst. Deterioration of the three-way catalyst is determined on the basis of an output of the O2 sensor, which is detected during air-fuel ratio switching control in which an air-fuel ratio is alternately switched to the rich side and lean side of the stoichiometric air-fuel ratio according to a detected equivalent ratio detected by the LAF sensor, on the basis of a result of comparison between an oxygen inflow into the three-way catalyst and a lean side-limiting value and a rich side-limiting value which are target values of the oxygen inflow. Fuel injection timing retardation control and/or divided fuel injection control are prohibited during the deterioration determination.

4 Claims, 5 Drawing Sheets

(51) Int. Cl.
*F01N 13/00* (2010.01)
*F02D 41/02* (2006.01)
*F02D 41/14* (2006.01)
*F02D 41/40* (2006.01)

(52) U.S. Cl.
CPC .. *F01N 2560/07* (2013.01); *F01N 2900/1402* (2013.01); *F02D 2200/021* (2013.01); *Y02T 10/22* (2013.01); *Y02T 10/47* (2013.01)

CATALYST DETERIORATION DETERMINATION SYSTEM

CROSS REFERENCES TO RELATED APPLICATIONS

The present application claims priority under 35 U.S.C. § 119 to Japanese Patent Application No. 2017-017886, filed Feb. 2, 2017, entitled "CATALYST DETERIORATION DETERMINATION SYSTEM." The contents of this application are incorporated herein by reference in their entirety.

TECHNICAL FIELD

The present disclosure relates to a catalyst deterioration determination system provided in an exhaust passage of an internal combustion engine, and configured to determine deterioration of a catalyst for purifying exhaust gas.

BACKGROUND

Heretofore, a technique has been known for determining deterioration of a catalyst (hereinafter simply referred to as "catalyst") that purifies exhaust gas of an internal combustion engine, and Japanese Patent Application Publication No. 2007-285288 discloses a deterioration determination system proposed by the present applicant, for example. In the deterioration determination system, first and second oxygen concentration sensors are respectively provided on the upstream side and downstream side of a three-way catalyst, and oxygen inflow into the three-way catalyst is calculated on the basis of an intake air volume and oxygen concentration detected by the first oxygen concentration sensor. Additionally, air-fuel ratio switching control (perturbation control) is performed to alternately switch the air-fuel ratio of an air-fuel mixture to the rich side and lean side of the stoichiometric air-fuel ratio, according to a result of comparison between the calculated oxygen inflow and its target value. Then, it is determined that the three-way catalyst is deteriorated when output of the second oxygen concentration sensor fluctuates largely during the air-fuel ratio switching control.

SUMMARY

However, it has been found that this conventional determination system may erroneously determine, for a later-mentioned reason, deterioration of the three-way catalyst even through there actually is no deterioration, if a fuel injection timing is retarded or fuel is injected in a divided manner in a warm-up state or the like of the internal combustion engine during the aforementioned deterioration determination.

It is preferable to provide a catalyst deterioration determination system that can effectively prevent the aforementioned erroneous determination, and improve accuracy of determining catalyst deterioration.

A first aspect of the embodiments is a catalyst deterioration determination system configured to determine deterioration of a catalyst (three-way catalyst 14a) provided in an exhaust system (exhaust passage 12 in the embodiment (the same applies hereinafter in the paragraph)) of an internal combustion engine 1, having an oxygen storing capacity, and purifies exhaust gas, the system characterized by including: a first oxygen concentration sensor (LAF sensor 27) that is provided on the upstream side of the catalyst; a second oxygen concentration sensor (O2 sensor 28) that is provided on the downstream side of the catalyst; an oxygen inflow calculation means (ECU 5) that calculates an amount of oxygen flowing into the catalyst as an oxygen inflow OS; air-fuel ratio switching control means (ECU 5, steps 21, 22 of FIG. 7, FIG. 8) that performs air-fuel ratio switching control in which control is performed to alternately switch an air-fuel ratio of an air-fuel mixture supplied to the internal combustion engine 1 to a rich side and a lean side of a stoichiometric air-fuel ratio, according to an oxygen concentration (detected equivalent ratio KACT) detected by the first oxygen concentration sensor, on the basis of a result of comparison between the calculated oxygen inflow OS and a target value (lean side-limiting value OSOBJL, rich side-limiting value OSOBJR) of the oxygen inflow OS; deterioration determination means (ECU 5, step 23 of FIG. 7) that determines deterioration of the catalyst, on the basis of an output (O2 sensor output SVO2) of the second oxygen concentration sensor detected during the air-fuel ratio switching control; and prohibition means (ECU 5, steps 13, 12 of FIG. 3) that prohibits, during deterioration determination by the deterioration determination means, both or any one of retard control in which a fuel injection timing is retarded, and divided injection control in which fuel is injected in multiple divided times.

The catalyst to which the present disclosure is applied has an oxygen storing capacity, and first and second oxygen concentration sensors are provided on the upstream side and downstream side of the catalyst, respectively. In the deterioration determination system of the present disclosure, the oxygen inflow into the catalyst is calculated, and air-fuel ratio switching control (perturbation control) is performed to alternately switch an air-fuel ratio of an air-fuel mixture to the rich side and lean side of the stoichiometric air-fuel ratio, according to the oxygen concentration in exhaust gas detected by the first oxygen concentration sensor, on the basis of a result of comparison between the calculated oxygen inflow and its target value. Accordingly, by setting the target value of oxygen inflow to an oxygen amount that is storable in a normal state of the catalyst but is not storable after deterioration of the catalyst, deterioration of the catalyst can be determined on the basis of output of the second oxygen concentration sensor.

As mentioned earlier, if a fuel injection timing is retarded or fuel is injected in a divided manner during the aforementioned deterioration determination, deterioration of the catalyst may be erroneously determined even though there actually is no deterioration. The conceivable reason is as follows. That is, if the injection timing is retarded or divided injection is performed, shortened vaporization time of fuel from the fuel injection to ignition is more likely to cause local richness where fuel is unevenly distributed inside the cylinder. When combustion is performed in this state, the H2 component in exhaust gas increases. Meanwhile, an oxygen concentration sensor used as the first oxygen concentration sensor normally adopts a characteristic that the diffusion velocity of a detection target gas when passing through a porous diffusion layer varies depending on the molecular weight of the gas. In the case of exhaust gas, a rich gas whose main components are CO and H2 has a smaller molecular weight than a lean gas whose main component is O2, and therefore has a higher diffusion velocity and larger sensor output.

For this reason, when the H2 component having a small molecular weight increases with injection timing retardation or divided injection as mentioned earlier, its diffusion velocity increases. This shifts output of the first oxygen concentration sensor further to the rich side than the actual oxygen concentration, that is, causes erroneous detection (erroneous recognition) that the oxygen concentration is on the rich side. As a result, air-fuel ratio switching control is performed while being shifted (erroneously corrected) to the lean side of the stoichiometric air-fuel ratio, according to the erroneous detection that the oxygen concentration is on the rich side. Hence, an unexpectedly large amount of oxygen flows into the catalyst in a lean operation during air-fuel ratio switching control, whereby output of the second oxygen concentration sensor fluctuates largely. This is considered to cause erroneous determination of catalyst deterioration.

In view of the foregoing, the present disclosure prohibits, during deterioration determination of the catalyst, retard control in which the fuel injection timing is retarded and/or divided injection control in which fuel is injected in multiple divided times. By thus prompting completion of fuel injection, it is possible to suppress local fuel richness inside the cylinder and thereby to suppress increase of the H2 component in exhaust gas. This can prevent erroneous detection by the first oxygen concentration sensor. As a result, air-fuel ratio switching control according to the oxygen concentration detected by the first oxygen concentration sensor can be performed accurately. Hence, it is possible to effectively prevent erroneous determination of deterioration of the catalyst caused by injection timing retardation and/or divided injection, and improve determination accuracy. In the above explanation of the exemplary embodiment, specific elements with their reference numerals are indicated by using brackets. These specific elements are presented as mere examples in order to facilitate understanding, and thus, should not be interpreted as any limitation to the accompanying claims.

DETAILED DESCRIPTION

Figure 1:
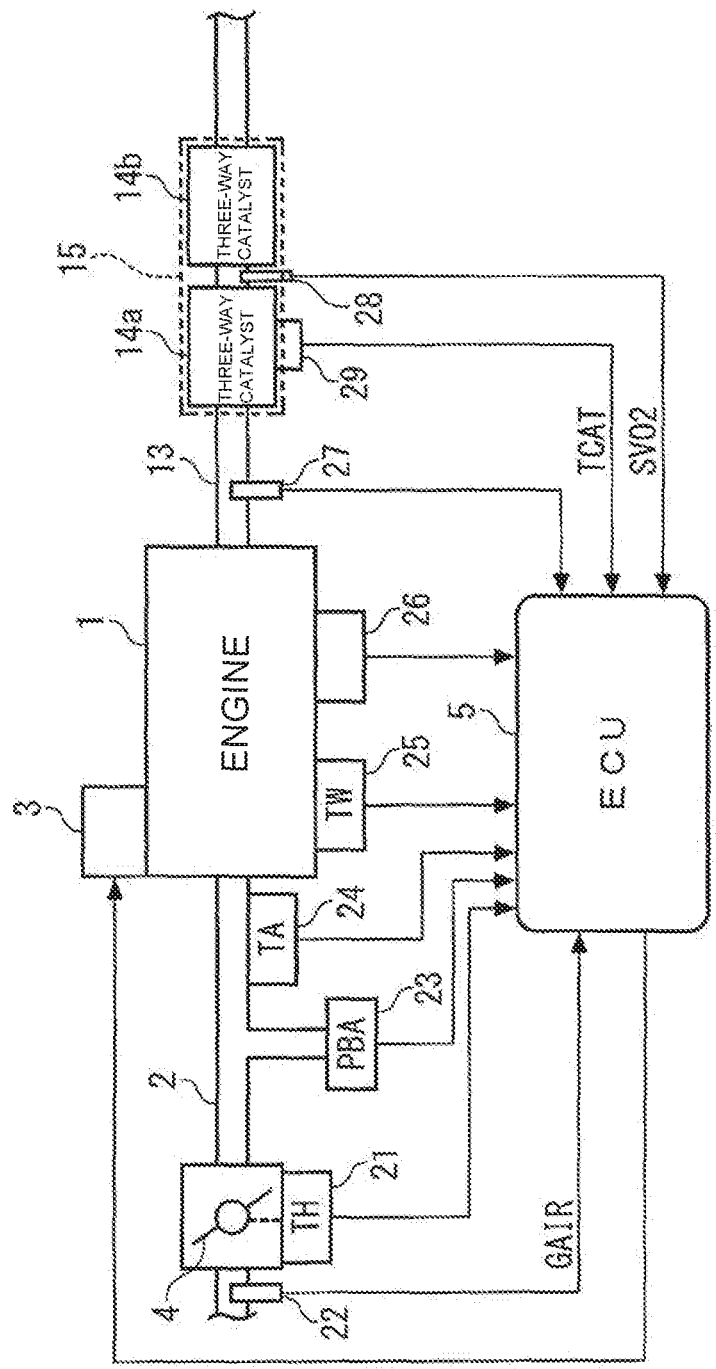
FIG. 1 is a diagram schematically illustrating a configuration of an internal combustion engine and its controller including a catalyst deterioration determination system of an embodiment of the present disclosure.

Hereinafter, a preferred embodiment of the present disclosure will be described in detail with reference to the drawings. An internal combustion engine (hereinafter referred to as "engine") 1 illustrated in FIG. 1 is a V6 gasoline engine loaded in a vehicle (not shown), for example, and, although not shown, includes three cylinders on each of two right and left banks. A fuel injection valve 3, a spark plug that ignites an air-fuel mixture in the cylinder, and other parts are provided in each cylinder. The fuel injection valve 3 is a direct-injection type that injects fuel directly into the cylinder, and is connected to a fuel pump (not shown). The duration and timing of opening the fuel injection valve 3 are controlled by a drive signal from an electronic control unit (hereinafter referred to as "ECU") 5, whereby a fuel injection amount and fuel injection timing are controlled.

A throttle valve 4 is provided in an intake passage 2 of the engine 1, and a throttle valve opening sensor 21 that detects an opening TH of the throttle valve is provided in the throttle valve 4. Additionally, an intake air volume sensor 22 that detects an intake air volume GAIR is provided on the upstream side of the throttle valve 4, while a boost pressure sensor 23 that detects a boost pressure PBA and an intake air temperature sensor 24 that detects an intake air temperature TA are provided on the downstream side of the throttle valve 4. Moreover, a water temperature sensor 25 that detects a cooling water temperature (hereinafter referred to as "engine water temperature") TW is provided in a main body of the engine 1. Detection signals of the sensors 21 to 25 are input into the ECU 5.

A CRK signal and a TDC signal, which are pulse signals indicating a rotation angle position of a crankshaft (not shown), are also input into the ECU 5, from a crankshaft angle sensor 26. The CRK signal is output with each predetermined crank angle (e.g., 30 degrees). The ECU 5 calculates a speed (hereinafter referred to as "engine speed") NE of the engine 1, on the basis of the CRK signal.

The TDC signal is a signal indicating that a piston in any of the cylinders is in a crank angle position slightly off to the retard side, from a top dead center (intake TDC) at the beginning of an intake stroke. When the engine 1 has six cylinders as in the case of the embodiment, the TDC signal is output with every 120-degree crank angle.

Meanwhile, an exhaust passage 13 is configured of two exhaust passages for the right and left banks, and each exhaust passage has a catalyst unit 15 in which three-way catalysts 14a and 14b are accommodated in a single container. The three-way catalysts 14a and 14b have an oxygen storing capacity, and in an exhaust gas-lean state where the air-fuel ratio of an air-fuel mixture supplied to the engine 1 is adjusted to the lean side of the stoichiometric air-fuel ratio and the oxygen concentration in exhaust gas is relatively high, the three-way catalysts store oxygen in the exhaust gas. Conversely, in an exhaust gas-rich state where the air-fuel ratio of the air-fuel mixture is adjusted to the rich side of the stoichiometric air-fuel ratio and the oxygen concentration in the exhaust gas is relatively low while a large amount of HC and CO components are contained, the three-way catalysts 14a and 14b have a function of oxidizing and purifying HC and CO in the exhaust gas by the stored oxygen.

A proportional oxygen concentration sensor (hereinafter referred to as "LAF sensor") 27 as a first oxygen concentration sensor is provided on the upstream side of the catalyst unit 15. The LAF sensor 27 outputs a detection signal proportional to the oxygen concentration (air-fuel ratio) in exhaust gas to the ECU 5. The ECU 5 uses the detection signal to calculate a detected equivalent ratio KACT, as an actual air-fuel ratio of exhaust gas flowing into the three-way catalyst 14a.

A binary oxygen concentration sensor (hereinafter referred to as "O2 sensor") 28 as a second oxygen concentration sensor is provided between the three-way catalysts 14a and 14b of the catalyst unit 15, and its detection signal is input into the ECU 52. The O2 sensor 28 has an output characteristic of changing drastically before and after the stoichiometric air-fuel ratio, and the level of its output (hereinafter referred to as "O2 sensor output") SVO2 becomes high on the rich side of the stoichiometric air-fuel ratio, and low on the lean side thereof. A catalyst temperature sensor 29 that detects a temperature (hereinafter referred to as "catalyst temperature") TCAT of the three-way catalyst 14a is provided in the three-way catalyst, and its detection signal is input into the ECU 5.

The ECU 5 is configured of a microcomputer formed of a CPU, a RAM, a ROM, an I/O interface (none of which is shown), and other parts. The ECU 5 performs fuel injection control in which the fuel injection amount and injection mode of the fuel injection valve 3 are controlled according to detection signals of the aforementioned various sensors 20 to 29, and also determines deterioration of the three-way catalyst.

In the embodiment, the ECU 5 corresponds to oxygen inflow calculation means, air-fuel ratio switching control means, deterioration determination means, and prohibition means.

Figure 2:
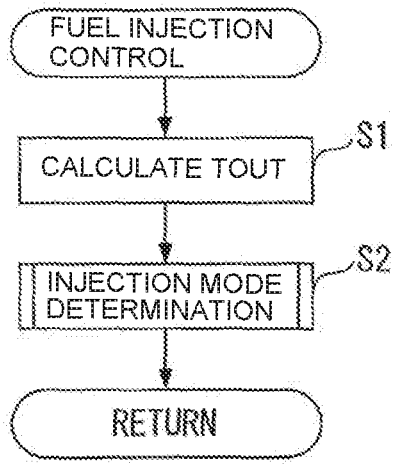
FIG. 2 is a flowchart illustrating fuel injection control processing.

FIG. 2 illustrates fuel injection control processing performed by the ECU 5. The processing is performed for each cylinder in synchronization with generation of a TDC signal. In the processing, first, in step 1 (illustrated as "S1" in FIG. 2; the same shall apply hereinafter), a fuel injection time TOUT corresponding to a fuel injection amount of the fuel injection valve 3 is calculated. The calculation is performed by use of the following equation (1).

$$TOUT = TIM \cdot KCMD \cdot KAF \cdot K1 + K2 \quad (1)$$

Here, TIM is a basic fuel injection time corresponding to a basic fuel amount, and is calculated by searching a predetermined TIM table (not shown) according to a detected intake air volume GAIR, so that the air-fuel ratio of an air-fuel mixture supplied to the engine 1 is substantially equal to the stoichiometric air-fuel ratio.

KCMD is a target equivalent ratio corresponding to a target air-fuel ratio of the air-fuel mixture. During normal control, KCMD is set according to the operation state of the engine 1. During later-mentioned deterioration determination of the three-way catalyst, KCMD is set such that the air-fuel ratio is alternately adjusted to the rich side and lean side of the stoichiometric air-fuel ratio.

KAF is an air-fuel ratio correction coefficient, and is calculated by feedback control through PID control, for example, such that the detected equivalent ratio KACT detected by the LAF sensor 27 coincides with the target equivalent ratio KCMD, when conditions for performing feedback control are met during normal control, or during deterioration determination of the three-way catalyst.

K1 and K2 are an other correction coefficient and correction amount, respectively, and are appropriately calculated according to an engine parameter signal detected by the aforementioned various sensors, such as the intake air temperature TA and the engine water temperature TW.

Next, in step 2, a fuel injection mode is determined, and the processing of FIG. 2 is terminated. The injection mode is configured of: a divided injection mode in which fuel injection is divided into two times; an injection timing retard mode in which fuel is injected at one time at a retarded injection timing; and a normal injection mode in which fuel is injected at one time at a normal injection timing. The divided injection mode and the injection timing retard mode are selected to suppress generation of soot caused by attachment of fuel to the piston in a cold state of the engine 1, for example.

Figure 3:
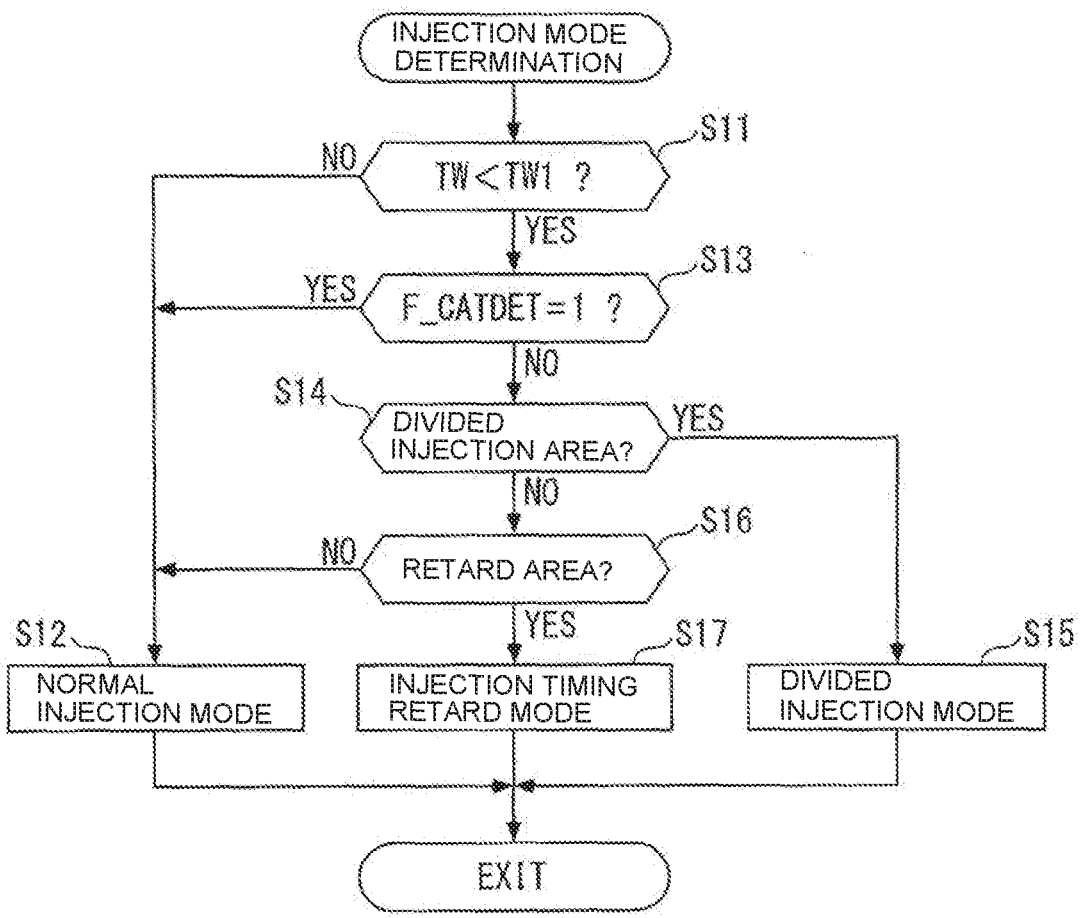
FIG. 3 is a flowchart illustrating injection mode determination processing of FIG. 2.

The injection mode is determined by processing of FIG. 3. In the processing, first, in step 11, it is determined whether the engine water temperature TW is lower than a first predetermined value TW1 (e.g., 80° C.). If the answer is NO, this indicates that the engine 1 is not in a cold state so the processing proceeds to step 12, the injection mode is determined to be the normal injection mode, and the processing is terminated. As described earlier, in the normal injection mode, fuel for a single combustion is injected at one time in an admission stroke, and the injection timing is set at a relatively early (on the advanced side) timing in the admission stroke, depending on the engine water temperature and the intake air volume GAIR.

If the answer in the aforementioned step 11 is YES and the engine 1 is in a cold state, in step 13, it is determined whether a deterioration determination execution flag F_CATDET is "1." As will be described later, the deterioration determination execution flag F_CATDET is set to "1" during execution of deterioration determination of the three-way catalyst.

Figure 4:
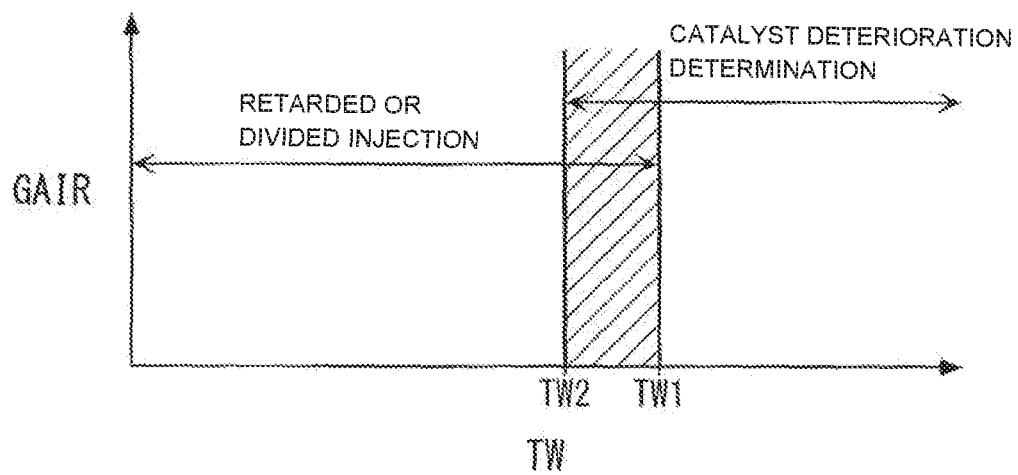
FIG. 4 is a diagram illustrating a relationship between an area of injection timing retardation and divided injection depending on an engine water temperature, and an execution area of deterioration determination.

FIG. 4 illustrates a relationship between an area of the injection timing retard mode and divided injection mode depending on the engine water temperature TW, and an execution area of deterioration determination of the three-way catalyst. As illustrated in FIG. 4, according to a condition that the three-way catalyst should be in an active state, the execution area of deterioration determination is set to an area where the engine water temperature TW is not lower than a second predetermined value TW2 (e.g., 69° C.) lower than the first predetermined value TW1. For this reason, in an area (hatched area) where the engine water temperature TW is between the first and second predetermined values TW1, TW2, deterioration determination and injection timing retardation or divided injection may be performed concurrently.

Figure 5:
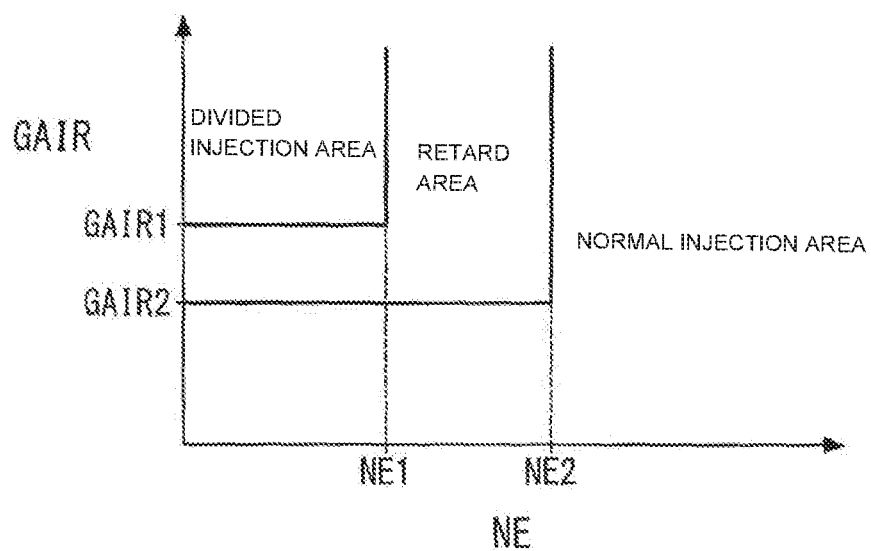
FIG. 5 is a map used for determination of an injection mode.

If the answer is NO in the aforementioned step 13 and deterioration of the three-way catalyst is not being determined, in step 14 and afterward, the injection mode is determined according to the engine speed NE and the intake air volume GAIR based on a map in FIG. 5.

As illustrated in FIG. 5, in the map, an area where the engine speed NE is not higher than a first predetermined value NE1, and the intake air volume GAIR is not smaller than a first predetermined value GAIR1 is set as a divided injection area. Also, an area where the engine speed NE is not higher than a second predetermined value NE2 larger than the first predetermined value NE1, and the intake air volume GAIR is not smaller than a second predetermined value GAIR2 smaller than the first predetermined value GAIR1 is set as a retard area. Moreover, areas other than the divided injection area and the retard area are set as a normal injection area.

Accordingly, if the answer in the aforementioned step 14 is YES and the engine 1 is in the divided injection area, the injection mode is determined to be the divided injection mode (step 15), and the processing is terminated. As described earlier, in the divided injection mode, injection of fuel for a single combustion is divided into two times in an admission stroke, and the timing of the second injection is set to a predetermined timing later (on the retarded side) than in the aforementioned normal injection mode.

If the answer in the aforementioned step 14 is NO, in step 16, it is determined whether the engine 1 is in the retard area. If the answer is YES and the engine is in the retard area, the injection mode is determined to be the injection timing retard mode (step 17), and the processing is terminated. As described earlier, in the injection timing retard mode, fuel for a single combustion is injected at one time in an admission stroke, and the injection timing is set to a predetermined timing later than in the aforementioned normal injection mode.

If the answer in the aforementioned step 16 is NO, that is, if the engine 1 is in the normal injection area, the processing proceeds to the aforementioned step 12, and the injection mode is determined to be the normal injection mode.

On the other hand, if the answer in the aforementioned step 13 is YES and deterioration of the three-way catalyst is being determined, the processing proceeds to the aforementioned step 12, and the injection mode is determined to be the normal injection mode. In other words, if deterioration is being determined, even if the engine 1 is in a cold state, divided injection and injection timing retardation are prohibited and normal injection is forcibly performed, regardless of the operation state such as engine speed.

Next, deterioration determination of the three-way catalyst will be described. The deterioration determination is made directly for the three-way catalyst 14a. If it is determined that the three-way catalyst 14a is deteriorated, it is assumed that the three-way catalyst 14b is similarly deteriorated, and a warning lamp is lit, for example.

The deterioration determination of the three-way catalyst is made, based on the O2 sensor output SVO2 when the air-fuel ratio of the air-fuel mixture supplied to the engine 1 is alternately changed to the lean side and rich side of the stoichiometric air-fuel ratio (when a lean operation and rich operation are performed alternately). Control performed by thus alternating the lean operation and rich operation is hereinafter referred to as "perturbation control."

Figure 6A:
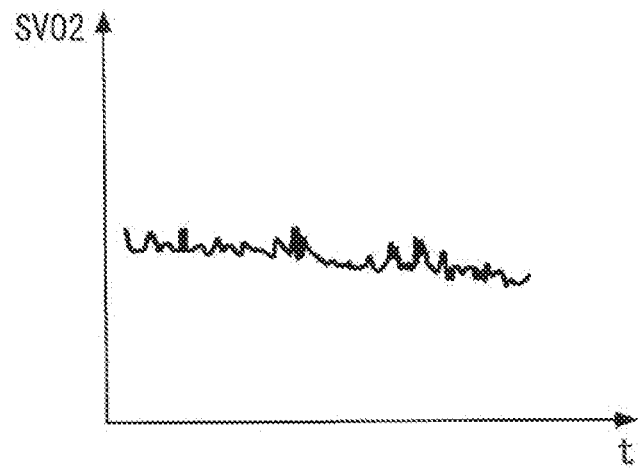
FIGS. 6A and 6B are a diagram for describing a method of determining deterioration of a catalyst.
Figure 6B:
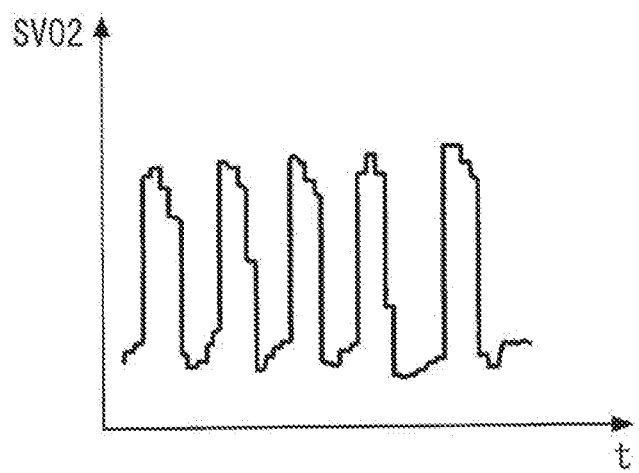

Specifically, a lean operation is performed such that an amount of oxygen that is storable in a normal state of the three-way catalyst but not storable after deterioration of the three-way catalyst, is supplied to the three-way catalyst. Then, after switching to a rich operation, the rich operation is performed such that the oxygen stored in the three-way catalyst is almost completely discharged. When such perturbation control is performed, if the three-way catalyst is normal, the O2 sensor output SVO2 hardly changes as illustrated in FIG. 6A. However, if the three-way catalyst is deteriorated, the O2 sensor output SVO2 changes drastically as illustrated in FIG. 6B. Accordingly, it is possible to determine deterioration of the three-way catalyst based on the changing state of the O2 sensor output SVO2.

Figure 7:
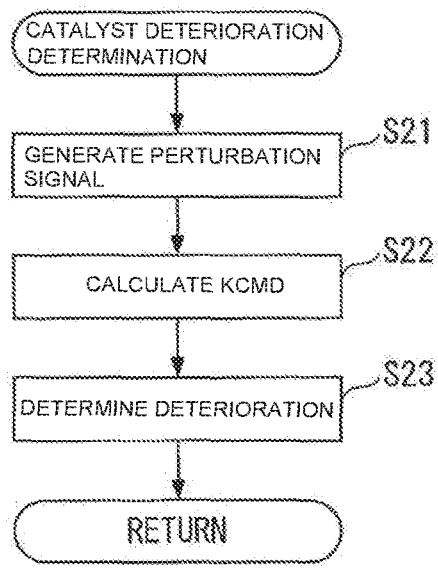
FIG. 7 is a flowchart illustrating a main flow of catalyst deterioration determination processing.

FIG. 7 illustrates deterioration determination processing of the three-way catalyst performed on the basis of such a determination method. As described earlier, the deterioration determination processing is performed by the ECU 5 at each predetermined time, on condition that the engine water temperature TW be not lower than the second predetermined value TW2. While performing the deterioration determination processing, divided injection and injection timing retardation are prohibited as mentioned earlier. Note that the deterioration determination processing is basically the same as that described in the aforementioned Japanese Patent Application Publication No. 2007-285288. Hence, FIG. 7 illustrates a main flow of the processing, and its outline will be described.

In the processing, first, in step 21, a perturbation signal for performing perturbation control is generated in the following manner, for example.

a. Calculate an oxygen concentration parameter O2N proportional to the oxygen concentration in exhaust gas, according to the detected equivalent ratio KACT detected by the LAF sensor 27.

The oxygen concentration parameter O2N is calculated, so that it takes a value 0 when KACT=1.0 (stoichiometric air-fuel ratio), takes a positive value when KACT<1.0 (leaner than stoichiometric air-fuel ratio), and takes a negative value when KACT>1.0 (richer than stoichiometric air-fuel ratio).

b. Calculate a reference oxygen amount OSC as a reference for catalyst deterioration, according to the intake air volume GAIR.

c. Calculate first and second temperature correction coefficients KTCATR, KTCATL, according to the catalyst temperature TCAT.

The first temperature correction coefficient KTCATR is for use during a rich operation, takes a negative value, and is calculated as a smaller value (value having larger absolute value) for a higher catalyst temperature TCAT.

The second temperature correction coefficient KTCATL is for use during a lean operation, takes a positive value, and is calculated as a larger value for a higher catalyst temperature TCAT.

d. Apply the reference oxygen amount OSC, and the first and second temperature correction coefficients KTCATR, KTCATL to the following equations (2), (3), to calculate a rich side-limiting value OSOBJR and a lean side-limiting value OSOBJL.

$$OSOBJR = OSC \cdot KTCATR \quad (2)$$

$$OSOBJL = OSC \cdot KTCATL \quad (3)$$

The rich side-limiting value OSOBJR and the lean side-limiting value OSOBJL are target values of an oxygen inflow OS calculated in later-described "e", and are used as thresholds when switching the air-fuel ratio between the rich and lean sides in perturbation control.

The lean side-limiting value OSOBJL corresponds to an oxygen inflow that is storable in a normal state of the three-way catalyst but is not storable after deterioration of the three-way catalyst, whereas the rich side-limiting value OSOBJR is set to a negative value having substantially the same absolute value as the lean side-limiting value OSOBJL.

e. Apply the oxygen concentration parameter O2N of "a" to the following equation (4) to calculate a rate of oxygen inflow O2, and apply the rate of oxygen inflow O2 to the following equation (5) to calculate the oxygen inflow OS.

$$O2 = O2N \cdot GAIRAVE \quad (4)$$

$$OS = OS + O2 \quad (5)$$

Here, GAIRAVE is a moving average of predetermined multiple intake air volumes GAIR, and OS on the right side of equation (5) is the previous value.

According to the method of calculating the oxygen concentration parameter O2N in "a" and equations (4) and (5), during a lean operation, the rate of oxygen inflow O2 takes a positive value while the oxygen inflow OS gradually increases. Meanwhile, during a rich operation, the rate of oxygen inflow O2 takes a negative value while the oxygen inflow OS gradually decreases and comes to take a negative value with progression of the rich operation.

f. When the oxygen inflow OS exceeds the lean side-limiting value OSOBJL in "d," this indicates that the oxygen inflow OS has reached the target value during lean operation, and therefore an air-fuel ratio switching parameter KOSFB is set to "1" to switch to a rich operation.

Similarly, when the oxygen inflow OS drops below the rich side-limiting value OSOBJR, this indicates that the oxygen inflow OS has reached the target value during rich operation, and therefore the air-fuel ratio switching parameter KOSFB is set to "−1" to switch to a lean operation.

Figure 8:
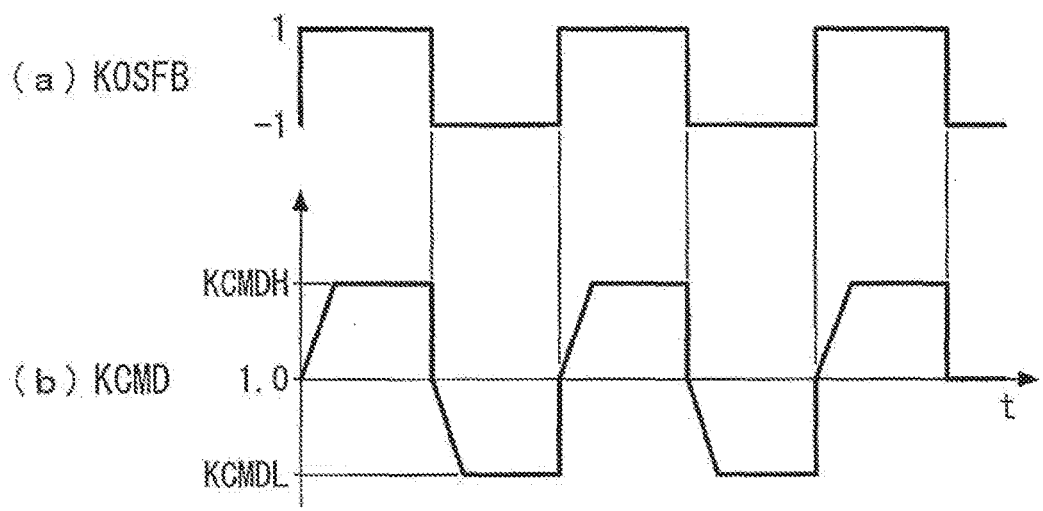
FIG. 8 is a timing chart for describing an operation of perturbation control performed in the deterioration determination processing in FIG. 7.

With these settings, it is possible to alternately switch between "1" and "−1" as illustrated in part (a) of FIG. 8, every time the oxygen inflow OS reaches a target value during lean or rich operation.

After generating a perturbation signal in the above manner in step 21 of FIG. 7, the target equivalent ratio KCMD is calculated in step 22. This calculation is performed by setting the target equivalent ratio KCMD for lean operation and rich operation according to the air-fuel ratio switching parameter KOSFB, to thereby perform perturbation control. The calculation is performed in the following manner, for example.

g. When the air-fuel ratio switching parameter KOSFB is "1," the target equivalent ratio KCMD is set to value 1.0 corresponding to the stoichiometric air-fuel ratio, immediately after switching of the air-fuel ratio switching parameter KOSFB from "−1." Thereafter, the target equivalent ratio KCMD is updated by the following equation (6).

$$KCMD=KCMD+\Delta KCMD \quad (6)$$

Here, $\Delta KCMD$ is a predetermined value for updating.

By thus repeating updates by equation (6), when the air-fuel ratio switching parameter KOSFB is "1," the target equivalent ratio KCMD gradually increases from value 1.0, that is, the air-fuel ratio gradually changes toward the rich side. Additionally, the increased target equivalent ratio KCMD undergoes limit processing by a predetermined upper limit value KCMDH (see part (b) of FIG. 8).

h. On the other hand, when the air-fuel ratio switching parameter KOSFB is "−1," the target equivalent ratio KCMD is set to value 1.0 immediately after switching of the air-fuel ratio switching parameter KOSFB from "1." Thereafter, the target equivalent ratio KCMD is updated by the following equation (7), using the aforementioned predetermined value $\Delta KCMD$.

$$KCMD=KCMD-\Delta KCMD \quad (7)$$

By thus repeating updates by equation (7), when the air-fuel ratio switching parameter KOSFB is "−1," the target equivalent ratio KCMD gradually decreases from value 1.0, that is, the air-fuel ratio gradually changes toward the lean side. Additionally, the decreased target equivalent ratio KCMD undergoes limit processing by a predetermined lower limit value KCMDL (see part (b) of FIG. 8).

With the calculation processing described above, as illustrated in FIG. 8, during perturbation control, the target equivalent ratio KCMD changes as illustrated in part (b) of FIG. 8 according to the value of the air-fuel ratio switching parameter KOSFB (part (a) of FIG. 8). Additionally, during perturbation control, feedback control is performed on the air-fuel ratio, by calculating the air-fuel ratio correction coefficient KAF in the aforementioned equation (1) such that the detected equivalent ratio KACT detected by the LAF sensor 27 coincides with the calculated target equivalent ratio KCMD.

After calculating the target equivalent ratio KCMD in the above manner in step 22 of FIG. 7, in step 23, deterioration determination is made. The deterioration determination is made by determining deterioration of the three-way catalyst 14a on the basis of the O2 sensor output SVO2 detected during perturbation control. The determination is made in the following manner, for example.

i. If the O2 sensor output SVO2 exceeds a predetermined threshold on the lean side of the stoichiometric air-fuel ratio during perturbation control, the excesses are counted.

j. If the excesses do not reach a predetermined number of times during perturbation control, this indicates that the O2 sensor output SVO2 is in the state illustrated in FIG. 6A, and the three-way catalyst 14a is determined to be in a normal state. On the other hand, if the excesses reach the predetermined number of times, this indicates that the O2 sensor output SVO2 is in the state illustrated in FIG. 6B, and the three-way catalyst 14a is determined to be in an abnormal state. To give notice of the abnormal state, a warning lamp is lit, for example.

As has been described, according to the embodiment, the injection timing retard mode in which the fuel injection timing is retarded, and the divided injection mode in which fuel is injected in multiple divided times, are prohibited during deterioration determination of the three-way catalyst. By thus prompting completion of fuel injection, it is possible to suppress local fuel richness inside the cylinder and thereby to suppress increase of the H2 component in exhaust gas. This can prevent erroneous detection by the LAF sensor 27. As a result, perturbation control according to the detected equivalent ratio KACT detected by the LAF sensor 27 can be performed accurately. Hence, it is possible to effectively prevent erroneous determination of deterioration of the three-way catalyst caused by injection timing retardation and divided injection, and improve determination accuracy.

Note that the present disclosure is not limited to the embodiment described above, and may be implemented in various forms. For example, the embodiment is configured to selectively use fuel injection timing retardation and divided fuel injection depending on the engine speed NE and intake air volume GAIR when the engine 1 is in a cold state, and to prohibit both of injection timing retardation and divided injection during deterioration determination of the three-way catalyst. The present disclosure is not limited to this, and may prohibit injection timing retardation during deterioration determination when only injection timing retardation is set, or may prohibit divided injection during deterioration determination when only divided injection is set.

Although the catalyst as a target of deterioration determination is a three-way catalyst in the embodiment, the catalyst is not limited as long as it has an oxygen storing capacity and purifies exhaust gas, and may be a NOx catalyst, for example. In the embodiment, the O2 sensor 28 is arranged between the three-way catalysts 14a, 14b, that is, the three-way catalyst 14b is provided on the downstream side of the O2 sensor 28. However, the present disclosure is also applicable when there is no three-way catalyst provided on the downstream side of the O2 sensor 28.

Although the engine is a vehicle engine in the embodiment, the present disclosure is not limited to this, and the disclosure is also applicable to a catalyst for exhaust emission control used in an engine other than a vehicle engine, such as a marine propulsion engine as typified by an outboard engine including a vertically arranged crankshaft. Alternatively, detailed configurations may be changed according to need, within the gist of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A catalyst deterioration determination system configured to determine deterioration of a catalyst, the catalyst being provided in an exhaust system of an internal combustion engine, having an oxygen storing capacity, and purifying exhaust gas, the system comprising:
   a first oxygen concentration sensor that is provided on the upstream side of said catalyst;
   a second oxygen concentration sensor that is provided on the downstream side of said catalyst;
   an oxygen inflow calculation controller configured to calculate an amount of oxygen flowing into said catalyst as an oxygen inflow;
   air-fuel ratio switching controller configured to perform air-fuel ratio switching control in which control is performed to alternately switch an air-fuel ratio of an air-fuel mixture supplied to said internal combustion engine between a rich side and a lean side of a stoichiometric air-fuel ratio, according to an oxygen concentration detected by said first oxygen concentration sensor, on the basis of a result of comparison between said calculated oxygen inflow and a target value of the oxygen inflow;
   a deterioration determination controller configured to perform a deterioration determination by determining deterioration of said catalyst, on the basis of an output of said second oxygen concentration sensor detected during the air-fuel ratio switching control; and
   a prohibition controller configured to prohibit, during the deterioration determination by the deterioration determination controller, both or any one of retard control in which a fuel injection timing is retarded, and divided injection control in which fuel is injected in multiple divided times.

2. The catalyst deterioration determination system according to claim 1, further comprising a fuel injection mode controller configured to determine a fuel injection mode in accordance with a temperature of the engine,
   wherein the fuel injection mode controller performs both or any one of the retard control and the divided injection control when the temperature of the engine is lower than a predetermined value which indicates the engine is in a cold state, and performs a normal injection control when the temperature of the engine is equal to or higher than the predetermined value,
   wherein the prohibition controller determines whether the deterioration determination is being performed by the deterioration determination controller, and if so, prohibits both or any one of the retard control and the divided injection control even though the temperature of the engine is lower than the predetermined value.

3. A catalyst deterioration determination method determining deterioration of a catalyst, the catalyst being provided in an exhaust system of an internal combustion engine, having an oxygen storing capacity, and purifying exhaust gas, the method comprising steps of:
   calculating, by using a controller, an amount of oxygen flowing into said catalyst as an oxygen inflow;
   performing, by using the controller, air-fuel ratio switching control in which control is performed to alternately switch an air-fuel ratio of an air-fuel mixture supplied to said internal combustion engine between a rich side and a lean side of a stoichiometric air-fuel ratio, according to an oxygen concentration detected by a first oxygen concentration sensor, on the basis of a result of comparison between said calculated oxygen inflow and a target value of the oxygen inflow, wherein the first oxygen concentration sensor is provided on the upstream side of said catalyst;
   performing, by using the controller, a deterioration determination by determining deterioration of said catalyst, on the basis of an output of a second oxygen concentration sensor detected during the air-fuel ratio switching control, wherein the second oxygen concentration sensor is provided on the downstream side of said catalyst;
   prohibiting, by using the controller, during performing the deterioration determination, both or any one of retard control in which a fuel injection timing is retarded, and divided injection control in which fuel is injected in multiple divided times.

4. The catalyst deterioration determination method according to claim 3, further comprising:
   determining, by using the controller, a fuel injection mode in accordance with a temperature of the engine so as to perform both or any one of the retard control and the divided injection control when the temperature of the engine is lower than a predetermined value which indicates the engine is in a cold state, and perform a normal injection control when the temperature of the engine is equal to or higher than the predetermined value,
   wherein the step of prohibiting determines whether the deterioration determination is being performed, and if so, prohibits both or any one of the retard control and the divided injection control even though the temperature of the engine is lower than the predetermined value.

* * * * *